(12) United States Patent
Huang

(10) Patent No.: US 9,832,526 B2
(45) Date of Patent: Nov. 28, 2017

(54) SMART PLAYBACK METHOD FOR TV PROGRAMS AND ASSOCIATED CONTROL DEVICE

(71) Applicant: MStar Semiconductor, Inc., Hsinchu Hsien (TW)

(72) Inventor: Hung-Chi Huang, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 14/860,883

(22) Filed: Sep. 22, 2015

(65) Prior Publication Data
US 2017/0061962 A1 Mar. 2, 2017

(30) Foreign Application Priority Data

Aug. 24, 2015 (TW) .............................. 104127465 A

(51) Int. Cl.
| | | |
|---|---|---|
| *G10L 15/00* | (2013.01) | |
| *G10L 21/00* | (2013.01) | |
| *H04N 21/443* | (2011.01) | |
| *G10L 15/26* | (2006.01) | |
| *H04N 21/422* | (2011.01) | |
| *H04N 21/482* | (2011.01) | |
| *G06F 17/27* | (2006.01) | |
| *H04N 21/462* | (2011.01) | |
| *H04N 21/466* | (2011.01) | |

(52) U.S. Cl.
CPC ....... *H04N 21/4432* (2013.01); *G06F 17/278* (2013.01); *G10L 15/26* (2013.01); *H04N 21/42203* (2013.01); *H04N 21/4622* (2013.01); *H04N 21/4668* (2013.01); *H04N 21/4828* (2013.01)

(58) Field of Classification Search
CPC ....... G10L 15/22; G10L 15/26; G10L 15/265; G10L 15/02; G10L 15/225; G10L 2015/223; G10L 2015/227; G10L 25/48; G10L 25/78; G10L 13/027; G10L 17/10; H04M 2250/74
See application file for complete search history.

(56) References Cited

U.S. PATENT DOCUMENTS

| | | | | |
|---|---|---|---|---|
| 7,136,817 B2* | 11/2006 | Schroder | ............... | G10L 15/26 704/270 |
| 9,338,493 B2* | 5/2016 | Van Os | .................. | G10L 15/22 |
| 2002/0059180 A1* | 5/2002 | Aoki | ..................... | H04H 60/31 |
| 2006/0028337 A1* | 2/2006 | Li | ......................... | G08C 17/00 340/539.1 |
| 2009/0138805 A1* | 5/2009 | Hildreth | ............ | G06K 9/00335 715/745 |
| 2009/0204410 A1* | 8/2009 | Mozer | .................... | G10L 15/30 704/275 |

(Continued)

FOREIGN PATENT DOCUMENTS

| | | |
|---|---|---|
| CN | 1825431 | 12/2010 |
| CN | 104660934 | 5/2015 |

*Primary Examiner* — Edgar Guerra-Erazo
(74) *Attorney, Agent, or Firm* — WPAT, PC

(57) ABSTRACT

A smart playback method for TV programs includes: converting voice data to text data including a plurality of words; selecting a keyword from the words in the text data; providing a TV program according to the keyword; and controlling a screen to play the TV program.

14 Claims, 2 Drawing Sheets

(56) References Cited

U.S. PATENT DOCUMENTS

| | | | | |
|---|---|---|---|---|
| 2009/0217324 | A1* | 8/2009 | Massimi | H04H 20/106 |
| | | | | 725/46 |
| 2010/0107184 | A1* | 4/2010 | Shintani | H04N 21/42201 |
| | | | | 725/10 |
| 2010/0109918 | A1* | 5/2010 | Liebermann | G10L 13/00 |
| | | | | 341/21 |
| 2010/0318357 | A1* | 12/2010 | Istvan | H04N 5/4403 |
| | | | | 704/251 |
| 2012/0316876 | A1* | 12/2012 | Jang | G06F 3/167 |
| | | | | 704/246 |
| 2014/0188486 | A1* | 7/2014 | You | G06F 3/167 |
| | | | | 704/275 |
| 2014/0337131 | A1* | 11/2014 | Edara | G06Q 30/0255 |
| | | | | 705/14.53 |
| 2015/0331666 | A1* | 11/2015 | Bucsa | G10L 15/30 |
| | | | | 704/275 |

\* cited by examiner

SMART PLAYBACK METHOD FOR TV PROGRAMS AND ASSOCIATED CONTROL DEVICE

This application claims the benefit of Taiwan application Serial No. 104127465, filed Aug. 24, 2015, the subject matter of which is incorporated herein by reference.

BACKGROUND OF THE INVENTION

Field of the Invention

The invention relates in general to a playback method for TV programs, and more particularly to a smart playback method for TV programs and associated control method.

Description of the Related Art

In general, users may select and watch preferred TV programs by manual setting or manual selection according to personal preferences. For example, a TV is manually controlled through a remote controller to set certain channels as user preferred channels, thus allowing a user to quickly switch to the preferred channels. However, although a user may quickly switch to a preferred channel, the channel may not play a program of a user interest. In current technologies, there are no mechanisms that are maturely developed for automatically selecting and/or playing corresponding TV programs according to user preferences. Instead, a user is required to look up a program schedule from a TV program guide and manually switch to a corresponding channel to watch a desired program. As such, it is apparent that current TV program technologies still lack adequate humanization.

SUMMARY OF THE INVENTION

It is an object of the present invention to provide a playback method for TV programs selected according to voice data and an associated control device for solving issues of the prior art.

A smart playback method for TV programs is provided according to an embodiment of the present invention. The method includes: converting voice data to text data including a plurality of words; selecting a keyword from the words in the text data; providing a TV program according to the keyword; and controlling a screen to play the TV program.

A control device for smart playback of TV programs is further provided according to another embodiment of the present invention. The device includes a memory and a processor. The memory stores at least one program. The processor executes at least one program stored in the memory to perform following operations: converting voice data to text data including a plurality of words; selecting a keyword from the words; providing a TV program according to the keyword; and controlling a screen to play the TV program.

The above and other aspects of the invention will become better understood with regard to the following detailed description of the preferred but non-limiting embodiments. The following description is made with reference to the accompanying drawings.

DETAILED DESCRIPTION OF THE INVENTION

By analyzing conversational voices of one or multiple users, the present invention selects one or multiple keywords of a user interest, and identifies a TV program associated with the one or more keywords of the user interest for playback.

Figure 1:
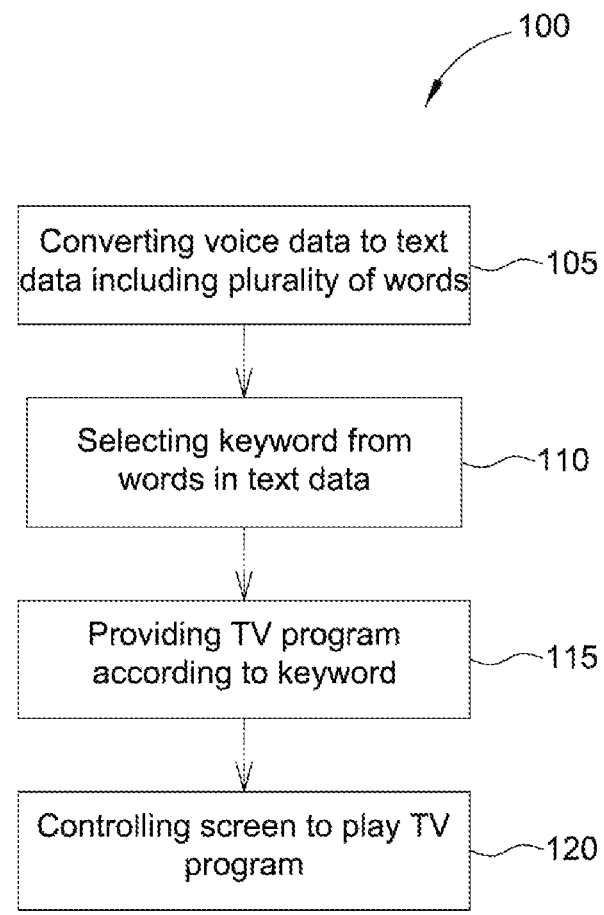
FIG. 1 is a flowchart of an example of a smart playback process for TV programs according to an embodiment of the present invention.

FIG. 1 shows a flowchart of a smart playback process 100 for TV programs according to an embodiment of the present invention. The process 100 includes multiple steps. Given substantially the same results are obtained, these steps of the process 100 need not be performed in the order shown in FIG. 1, and may be interleaved by other steps instead of being consecutively performed. Details of the steps of the process 100 are given below.

In step 105, voice data is converted to text data. The text data includes a plurality of words.

In step S110, a keyword is selected from the words in the text data.

In step S115, a TV program is provided according to the keyword.

In step S120, a screen is controlled to play the TV program.

Figure 2:
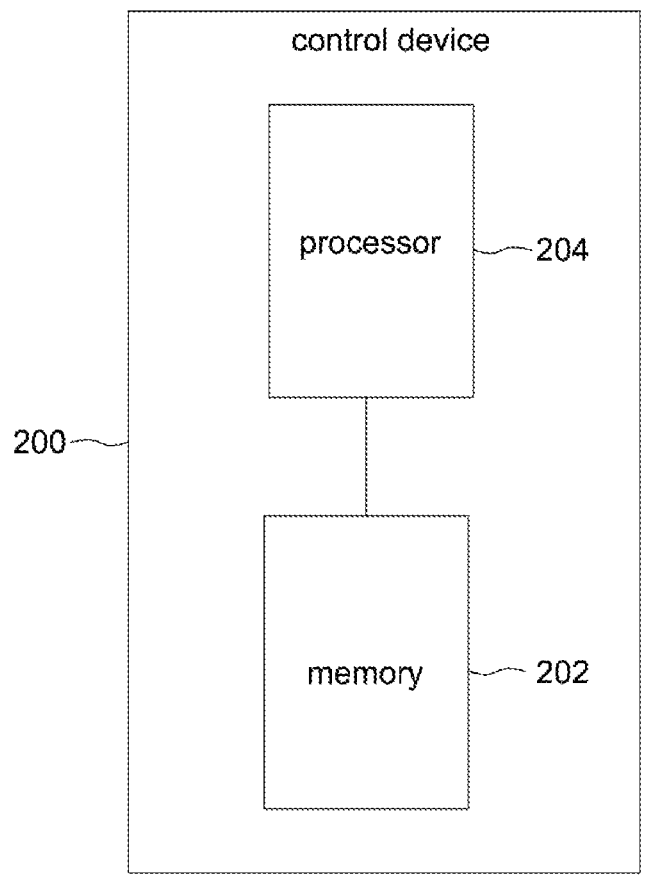
FIG. 2 is a schematic diagram of a control device according to an embodiment of the present invention.

FIG. 2 shows a schematic diagram of a control device 200 according to an embodiment of the present invention. The control device 200 includes at least one memory 202 and a processor 204. The processor 204 executes a program stored in the memory 202 to perform the process 100 in FIG. 1, for example. In practice, the control device 200 may be disposed in the TV or in a chip in an external TV set-up box (STB). In other embodiments, the process 100 may be realized through hardware circuit elements. In other words, the control device 200 may be a combination including software/hardware or be realized purely by hardware.

The processor 204 first converts voice data to text data including a plurality of words (105). For example, the voice data includes a sentence "I saw Brad Pitt at the Oscars." The voice data is converted by the processor 204 to text data including six sets of words "I", "saw", "Brad Pitt", "at", "the" and "Oscars". The voice data may be generated through a microphone according to conversational voices. For example, the microphone may be disposed on an electronic device such as a TV, an STB, a smart phone and/or a wearable device. Taking a microphone disposed on a TV for example, voice data may be generated according to a user located in the vicinity of the TV and be provided to the processor 204. In one embodiment, the microphone may be kept turned on. In another embodiment, the TV may include a built-in proximity sensor for detecting whether a user approaches, and the processor 204 controls and turns on the microphone through analysis on user behaviors to obtain the voice data. For example, if the processor 204 learns that the user often watches TV from seven to nine in the evening through analysis on user behaviors, the processor 204 may turn on the microphone before seven in the evening (e.g., six-thirty) to obtain the voice data. It should be noted that, when the microphone is turned on, the screen may be maintained in an original status. In other words, if the screen is turned on before the microphone is turned on, the screen is kept turned on after the microphone is turned on; if the screen is turned off before the microphone is turned on, the screen is kept turned off after the microphone is turned on.

Next, the processor 204 selects a keyword from the words in the text data (110). In one embodiment, the processor 204 first selects a plurality of candidate keywords from the words in the text data, and selects a word from the candidate keywords as the keyword. In one embodiment, the processor 204 selects nouns from the words in the text data as the candidate words. For example, in continuation of the foregoing example, the processor 204 first selects the nouns "Brad Pitt" and "Oscars" as the candidate words. In another embodiment, the processor 204 removes functional words from the words in the text data to select the candidate words. For example, the functional words are prepositions, conjunctions, particles, modal auxiliaries and adverbs. In other embodiments, from the words in the text data, the processor 204 may also select classic lines as the candidate words. Next, from the candidate words, the processor 204 may select word that matches a hot word in a hot word database as the keyword. For example, if a hot word in a hot word database includes "Brad Pitt", in continuation of the foregoing example, the processor 204 selects "Brad Pitt" as a keyword. In one embodiment, to satisfy a real-time computation requirement, instead of comparing the candidate words with a hot word database to select the keywords, the processor 204 directly uses the candidate words as the hot words. For example, in continuation of the foregoing example, the processor 204 directly utilizes the six sets of words "I", "saw", "Brad Pitt", "at", "the" and "Oscars" as the keywords. In one embodiment, the processor 204 may generate the hot words according to hot messages on the Internet to form the hot word database, and in real-time or periodically update the hot word database. For example, the processor 204 may connect to various websites through networks, and obtain hot keywords listed in these news websites as the hot words through detecting/analyzing texts of website contents listed these news websites (e.g., detecting texts of html files of webpages) to generate or update the hot word database. In one embodiment, the hot word database may be stored in the memory 202 in the control device 200, e.g., a flash memory.

The processor 204 then provides a TV program according to the one or multiple selected keywords (115). In one embodiment, the processor 204 may search a program information database to identify a TV program associated with the keyword. The TV program may include a sports program, an entertainment program, an intellectual/cultural program, a travel program, a religious/humanities program, a family program, a cartoon program, or a news/finance program. For example, when there is only one set of keywords, e.g., "Brad Pitt", the processor 204 identifies TV programs associated with "Brad Pitt" and currently being played or soon to be played, e.g., movies played by Brad Pitt or news interviews of Brad Pitt. If there are multiple keywords, e.g., "Brad Pitt" and "Oscars", the processor 204 identifies videos associated with "Brad Pitt" and "Oscars" e.g., news of Brad Pitt attending the Oscars. For example, the program information database may include information of a plurality of analog and/or digital TV programs, and the processor 204 may obtain information of the analog and/or digital TV programs through the Internet, e.g., an electronic program guide (EPG) and in real-time or periodically update the program information database. The processor 204 may also perform optical character recognition (OCR) on an image of an analog TV program to obtain information of the analog TV program.

Next, the processor 204 controls a screen to play the TV program (120). For example, the screen may be disposed on an electronic device such as a TV, a smart phone and/or a wearable device. In one embodiment, if the electronic device is turned on but does not yet play the TV program at a broadcast time of the TV program, the processor 204 may control and switch the channel of the TV to play the TV program. If the electronic device is turned off at a broadcast time of the TV program, the processor 204 may control the electronic device to automatically turn on and play the TV program. In one embodiment, the processor 204 may play the TV program according to a playback confirmation. For example, if the control device 200 is disposed on a TV, the processor 204 may control a wireless transceiver disposed on the TV to send a notification associated with the TV program to a cell phone or a wearable device of a user to remind the user that the TV program is currently being played or soon to be played on a specific channel. If the user wishes to watch the TV program, the user may send a playback confirmation corresponding to the TV program through the cell phone or the wearable device to the TV. As such, the processor 204 receives the playback confirmation corresponding to the TV program through the wireless transceiver, and controls the screen to play the TV program according to the playback confirmation, e.g., automatically switching the channel and playing the TV program or automatically turning on and playing the TV program. If there are multiple TV programs identified according to the selected one or multiple keywords, in one embodiment, the processor 204 may select and play one TV program according to broadcast times of the TV programs, or select the TV program not yet played but soonest to be played from the TV programs. However, it should be noted that, selecting and playing one TV program according to the broadcast times is not a limitation of the present invention, and the processor 204 may also select and play one TV program according to a network rating, i.e., IMDB.

With the device and method of the present invention, a TV program of user interest can be automatically selected according to conversational contents of users, thereby providing TV program playback with adequate humanization.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A smart playback method for TV programs, comprising:
   detecting whether a TV is turned on to obtain a detection result;
   turning on the TV when said detection result indicates that the TV is not turned on;
   detecting whether a user approaches by a proximity sensor;
   turning on a microphone to obtain voice data when the step of detecting whether a user approaches indicates that a user is approaches;
   converting the voice data to text data, wherein said text data comprise a plurality of words;
   selecting a keyword from the words in the text data;
   providing a TV program according to the keyword; and
   controlling a screen to play the TV program.

2. The method according to claim 1, wherein the step of selecting the keyword from the words in the text data comprises:
   selecting a plurality of candidate words from the words in the text data; and
   selecting the keyword from the candidate words.

3. The method according to claim 2, wherein the step of selecting the keyword from the candidate words comprises:

selecting a word that matches a hot word in a hot word database from the candidate words as the keyword.

4. The method according to claim 3, further comprising: generating a plurality of hot words according to hot messages on the Internet to form the hot word database.

5. The method according to claim 2, wherein the step of selecting the candidate words from the words in the text data comprises:
selecting nouns from the words in the text data as the candidate words.

6. The method according to claim 2, wherein the step of selecting the candidate words from the words in the text data comprises:
selecting the candidate words by removing functional words from the words in the text data.

7. The method according to claim 1, further comprising:
sending a notification associated with the TV program; and
receiving a playback confirmation corresponding to the notification;
wherein the step of controlling the screen to play the TV program comprises controlling the screen to play the TV program according to the playback confirmation.

8. A control device for smart playback of TV programs, comprising:
a memory, storing at least one program; and
a processor, coupled to the memory, executing the at least one program stored in the memory to perform a method, the method comprising:
detecting whether a TV is turned on to obtain a detection result;
turning on the TV when said detection result indicates that the TV is not turned on;
detecting whether a user approaches by a proximity sensor;
turning on a microphone to obtain voice data when the step of detecting whether a user approaches indicates that a user is approaches;
converting the voice data to text data, the text data comprising a plurality of words;
selecting a keyword from the words in the text data;
providing a TV program according to the keyword; and
controlling a screen to play the TV program.

9. The device according to claim 8, wherein the step of selecting the keyword from the words in the text data comprises:
selecting a plurality of candidate words from the words in the text data; and
selecting the keyword from the candidate words.

10. The device according to claim 9, wherein the step of selecting the keyword from the candidate words comprises:
selecting a word that matches a hot word in a hot word database from the candidate words as the keyword.

11. The device according to claim 10, wherein the method performed by the processor further comprises:
generating a plurality of hot words according to hot messages on the Internet to form the hot word database.

12. The device according to claim 9, wherein the step of selecting the candidate words from the words in the text data comprises:
selecting nouns from the words in the text data as the candidate words.

13. The device according to claim 8, wherein the method performed by the processor further comprises:
sending a notification associated with the TV program; and
receiving a playback confirmation corresponding to the notification;
wherein the step of controlling the screen to play the TV program comprises controlling the screen to play the TV program according to the playback confirmation.

14. The method according to claim 1, further comprising:
storing a history of times that a user watches the TV; and
turning on a microphone to obtain the voice data according to said history.

* * * * *